US012583422B2

(12) United States Patent　　　(10) Patent No.:　US 12,583,422 B2
Janson et al.　　　　　　　　　　　(45) Date of Patent:　Mar. 24, 2026

(54) BRAKE PEDAL MODULE

(71) Applicants:ZF Active Safety GmbH, Koblenz
(DE); ZF Friedrichshafen AG,
Friedrichshafen (DE)

(72) Inventors: Marcus Janson, Koblenz (DE);
Thomas Kramer, Oldenburg (DE);
Markus Wenzel, Bersenbrück (DE)

(73) Assignees: ZF Active Safety GmbH, Koblenz
(DE); ZF Friedrichshafen AG,
Friedrichshafen (DE)

( * ) Notice: Subject to any disclaimer, the term of this
patent is extended or adjusted under 35
U.S.C. 154(b) by 93 days.

(21) Appl. No.: 18/583,421

(22) Filed: Feb. 21, 2024

(65) Prior Publication Data

US 2024/0278752 A1　　Aug. 22, 2024

(30) Foreign Application Priority Data

Feb. 21, 2023　(DE) .......................... 102023104262.9

(51) Int. Cl.
　B60T 7/06　　　(2006.01)
　B60T 7/04　　　(2006.01)
　G05G 5/03　　　(2008.04)
　G05G 5/05　　　(2006.01)
(52) U.S. Cl.
　CPC ............... B60T 7/06 (2013.01); B60T 7/042
　　(2013.01); G05G 5/03 (2013.01); G05G 5/05
　　　(2013.01); *G05G 2505/00* (2013.01)

(58) Field of Classification Search
None
See application file for complete search history.

(56) References Cited

U.S. PATENT DOCUMENTS 6,289,762 B1 *　9/2001　Silva ........................ G05G 1/38
　　　　　　　　　　　　　　　　　　　　74/513
10,166,954 B2 *　1/2019　Houtman ................ B60T 7/042

FOREIGN PATENT DOCUMENTS

| DE | 102007030312 A1 | | 1/2009 | |
|---|---|---|---|---|
| DE | 102008063771 A1 | * | 6/2010 | ............. B60T 7/042 |
| DE | 102017118167 A1 | | 2/2018 | |
| DE | 102019219337 A1 | | 4/2021 | |
| DE | 102021124879 A1 | | 3/2023 | |
| EP | 4289690 A1 | | 12/2023 | |
| WO | 2022139650 A1 | | 6/2022 | |

\* cited by examiner

*Primary Examiner* — Vicky A Johnson
(74) *Attorney, Agent, or Firm* — Kristin L. Murphy

(57)　　　　　　　ABSTRACT

A brake pedal module for a brake-by-wire brake system of
a vehicle is disclosed, having a brake pedal, which can be
secured pivotably on the vehicle and can be moved between
a rest position and an end position, and a feedback unit for
producing a resistance during actuation of the brake pedal.
The feedback unit has a first counterforce unit, which urges
the brake pedal into the rest position, and at least one further
counterforce unit, which acts in parallel with the first coun-
terforce unit as regards their interconnection, and/or a damp-
ing unit, which acts in parallel with the first counterforce
unit as regards their interconnection.

16 Claims, 3 Drawing Sheets

BRAKE PEDAL MODULE

CROSS-REFERENCE TO RELATED APPLICATION

This application claims priority to German Priority Application No. 102023104262.9, filed Feb. 21, 2023, the disclosure of which is incorporated herein by reference in its entirety.

TECHNICAL FIELD

The disclosure relates to a brake pedal module for a "brake-by-wire" brake system of a vehicle.

BACKGROUND

In the case of "brake-by-wire" brake systems, a braking request from a driver and/or driver assistance system is detected electronically, and the brakes of the vehicle are actuated by one or more purely electric actuators. For this purpose, provision can be made for each of the brakes of the individual wheels to be assigned an electric-motor actuator of the kind known, for example, in an "EMB" (electric-motor brake). However, it is also possible to provide for an electrohydraulic actuator to be controlled centrally in order to actuate the brakes hydraulically in a conventional manner, is known, for example, in an "IBS" (integrated brake system). Moreover, a "brake-by-wire" brake system can be embodied as a hybrid system in which the brakes on one vehicle axle, e.g. those at the front wheels, are assigned to an "IBS" and the brakes on another vehicle axle, e.g. those at the rear wheels, are each configured as an "EMB".

Since there is generally no mechanical connection between a brake pedal and the brakes in "brake-by-wire" brake systems, a feedback behaviour of the brake pedal is simulated for the driver, e.g. by a counterforce unit. To be more precise, a higher resistance is effective as the brake pedal is actuated with an increasing travel.

Although such systems allow good simulation of a feedback behaviour of the brake pedal, integration into a vehicle environment is difficult on account of their size.

SUMMARY

What is needed is to provide a brake pedal module which is particularly compact.

According to the disclosure, a brake pedal module for a brake-by-wire brake system of a vehicle is disclosed, having a brake pedal, which can be secured pivotally on the vehicle and can be moved between a rest position and an end position, and a feedback unit for producing a resistance during actuation of the brake pedal. The feedback unit has a first counterforce unit, which urges the brake pedal into the rest position, and at least one further counterforce unit, which acts in parallel with the first counterforce unit as regards their interconnection, and/or a damping unit, which acts in parallel with the first counterforce unit as regards their interconnection.

Since the first counterforce unit and the further counterforce unit and/or damping unit are arranged in parallel with one another as regards their interconnection, the feedback unit can have a short length without impairing the feedback behaviour of the brake pedal. Thus, according to the disclosure, the feedback unit can also be accommodated in restricted installation spaces.

The damping unit and the further counterforce unit can be in the form of a combined unit.

For example, a counterforce unit produces a resistance when the brake pedal is actuated. Moreover, the counterforce unit brings about a return of the brake pedal into its rest position after actuation of the brake pedal.

When the brake pedal is actuated, the damping unit produces speed-dependent damping and hysteresis, thereby producing a pedal feel familiar to the driver.

The brake pedal is an upright brake pedal, for example. In this case, the advantages of the shortened feedback unit are effective since, in the case of an upright brake pedal, there is generally only a relatively limited installation space for the accommodation of the feedback unit.

In one exemplary arrangement, the brake pedal module has a support component for securing the brake pedal module on the vehicle, wherein the brake pedal is mounted pivotably on the support component. This simplifies the assembly of the brake pedal since the brake pedal can be preassembled outside the vehicle.

The feedback unit can be arranged between the brake pedal and the support component. In this case, the feedback unit can be attached to the support component. An advantage is thereby achieved that the brake pedal module can be placed particularly easily in an installation space environment. The components are retained on one another in such a way that, apart from the modular unit being secured on the vehicle, no additional mechanical support of some of these components on the vehicle is necessary. For example, only the support component has to be secured on the vehicle.

Thus, all the components of the brake pedal module are mounted on the support component, ensuring that the brake pedal module is a preassembled modular unit which is self-contained in terms of the forces involved. Moreover, the brake pedal module can be a compact design.

According to one exemplary arrangement, the first counterforce unit and the further counterforce unit and/or the damping unit are modular units arranged separately from one another. This means that each of the modular units has its own housing. As a result, flexible positioning of the modular units is possible.

The first counterforce unit, on the one hand, and the further counterforce unit and/or damping unit, on the other hand, are, for example, each coupled at one end to the brake pedal and, at the other end, are mounted, for example, pivotably mounted, on the vehicle. Actuation of the brake pedal thus acts directly on the first counterforce unit and/or the further counterforce unit and/or damping unit, thus directly simulating a feedback behaviour when the brake pedal is actuated. By virtue of the mounting on the vehicle, stable support of the first counterforce unit and the further counterforce unit and/or damping unit is furthermore ensured.

According to an alternative exemplary arrangement, the first counterforce unit and the further counterforce unit and/or damping unit can be supported by the brake pedal, on the one hand, and on the vehicle, on the other hand, via a common pivot bearing. Since there is only one pivot bearing at the brake pedal, the complexity of the brake pedal module is reduced, and this has a positive effect on production costs. More specifically, the first counterforce unit and the further counterforce unit and/or damping unit can each be accommodated in a separate housing and coupled mechanically by a transmission link. That is to say that each unit is mounted on the vehicle via a dedicated pivot bearing.

In another exemplary arrangement, the feedback unit comprises a housing in which the first counterforce unit, on the one hand, and the further counterforce unit and/or damping unit, on the other hand, are arranged parallel to one another. Since a common housing is used to accommodate the first counterforce unit and the further counterforce unit and/or damping unit, assembly of the feedback unit is significantly simplified. To be more precise, the first counterforce unit and the further counterforce unit and/or damping unit do not have to be handled and installed as separate units. Moreover, just one single bearing is required for mounting the feedback unit on the vehicle, instead of two bearings when the first counterforce unit and the further counterforce unit and/or damping unit are arranged separately.

It is possible to secure the housing on the vehicle. For example, the housing is pivotably mounted on the support component. As a result, the feedback device is correspondingly pivoted during a movement of the brake pedal, thus ensuring that the feedback unit does not block the movement of the brake pedal.

It is possible for either the first counterforce unit, on the one hand, or the further counterforce unit and/or damping unit, on the other hand, to be fixed mechanically in a pivotable manner on the brake pedal. This means that only one of the two units is fixed mechanically on the brake pedal. This likewise contributes to simplified mounting of the brake pedal module.

That unit from the group comprising, on the one hand, the first counterforce unit and, on the other hand, the further counterforce unit and/or damping unit which is not fixed mechanically in a pivotable manner on the brake pedal can be supported in a sliding manner on the brake pedal. That is to say that the unit which is not mechanically coupled is supported in a sliding manner. On the one hand, overdetermination of the bearing arrangement is thereby avoided. A sliding bearing arrangement can furthermore be implemented in a particularly simple manner.

In an alternative exemplary arrangement, the first counterforce unit and the further counterforce unit and/or damping unit can be connected to one another by a transmission link. When actuated, the brake pedal acts on only one of the two units, but the further unit is likewise activated via the transmission link. This likewise contributes to simplified construction of the brake pedal module.

The housing can be aligned in such a way that the first counterforce unit and the further counterforce unit and/or damping unit are arranged one above the other or side-by-side or laterally offset with respect to one another in an installed state in a vehicle. In this way, a high flexibility is achieved in respect of the installation position of the feedback unit. In other words, the alignment of the feedback unit can be adapted to a prevailing installation space situation.

According to one exemplary arrangement, the brake pedal module comprises a sensing unit for detecting a braking request from a driver. For example, a braking request is detected electronically. Based on the detected braking request, a signal can be passed to the actuators assigned to the wheels, which then produce a braking effect.

The sensor unit comprises, for example, a sensor for detecting an actuating travel and/or an actuating angle, and/or a sensor for detecting an actuating force.

The brake pedal module according to the disclosure is suitable for use in a "brake-by-wire" brake system, which is preferably equipped with "EMB" brakes and/or is configured as an "IBS" system.

BRIEF DESCRIPTION OF DRAWINGS

Further advantages and features of the disclosure will become apparent from the following description and from the attached drawings, to which reference is made. In the drawings.

DETAILED DESCRIPTION

Figures 1, 2:
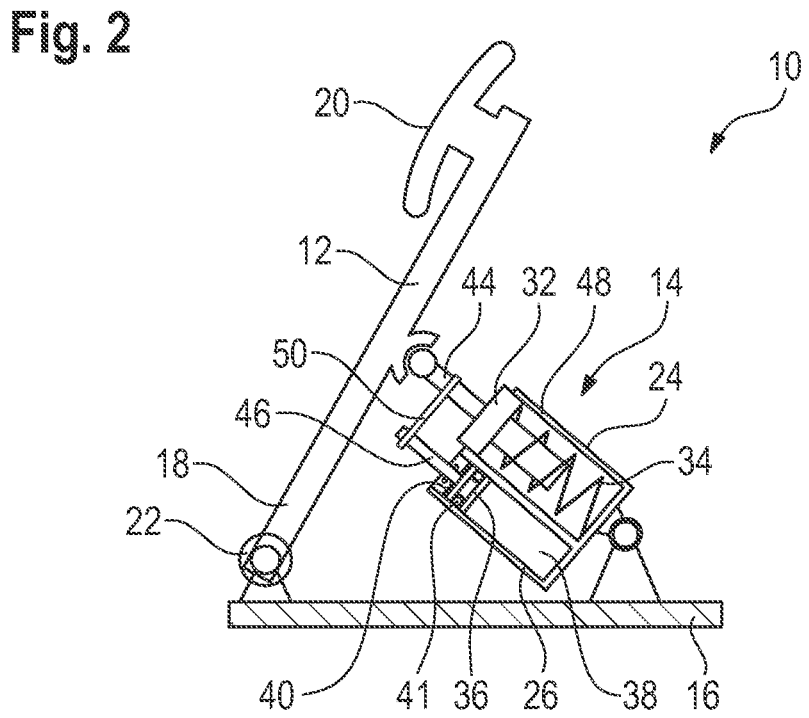
FIG. 1 shows schematically a brake pedal module according to the disclosure in a sectional illustration.
FIG. 2 shows schematically a brake pedal module according to the disclosure in accordance with another exemplary arrangement in a sectional illustration.

FIG. 1 shows schematically a brake pedal module 10 for a "brake-by-wire" brake system of a vehicle.

The brake pedal module 10 is used, for example, to electronically detect a braking request from a driver.

The brake pedal module 10 comprises a brake pedal 12, which can be secured pivotably on the vehicle.

The brake pedal 12 can be moved, for example pivoted, between a rest position and an end position. For this purpose, a driver can actuate the brake pedal 12 with their foot. In the figures, the brake pedal 12 is illustrated in its rest position.

Furthermore, the brake pedal module comprises a feedback unit 14, which produces a resistance when the brake pedal 12 is actuated.

Moreover, the brake pedal module 10 has a support component 16 for securing the brake pedal module 10 on the vehicle.

The brake pedal 12 is mounted pivotably on the support component 16.

However, it is also conceivable for there to be no support component 16 and for the brake pedal 12 to be mounted pivotably directly on a vehicle floor in the mounted state in the vehicle.

The feedback unit 14 is arranged between the brake pedal 12 and the support component 16. In the exemplary arrangement, the feedback unit 14 is attached to the support component 16.

The brake pedal 12 and the feedback unit 14 are thus pre-mounted on the support component 16. This means that, when the brake pedal module 10 is installed in an installation space environment, only the support component 16 has to be secured on the vehicle.

The brake pedal 12 is formed by a strut 18.

At a free end, the strut 18 has an actuating surface 20, which can be pressed by the foot of a driver to indicate a braking request.

The brake pedal module 10 furthermore comprises a sensor unit 22 for detecting a braking request from the driver. In the exemplary arrangement, the sensor unit 22 comprises an angle sensor, which is arranged on a pivot bearing of the brake pedal 12. However, it is also conceivable that the sensor unit 22 alternatively or additionally comprises a force sensor.

The feedback unit 14 has a first counterforce unit 24, which urges the brake pedal 12 into the rest position.

Furthermore, the feedback unit 14 has a unit 26 which acts in parallel with the first counterforce unit 24 as regards their interconnection and, in the exemplary arrangement shown in FIG. 1, is a combined counterforce unit and damping unit. However, the further unit 26 can also be designed exclusively for damping or as a counterforce unit without a damping action.

In the exemplary arrangement shown in FIG. 1, the first counterforce unit 24 and the counterforce and damping unit 26 are modular units arranged separately from one another, which, in particular, are each accommodated in a dedicated housing 28, 30.

The first counterforce unit 24, on the one hand, and the combined counterforce unit and damping unit 26, on the other hand, are each coupled at one end to the brake pedal 12 and, at the other end, are mounted, for example pivotably mounted, on the vehicle. More specifically, the two housings 28, 30 are each mounted pivotably at one end on the support component 16.

The first counterforce unit 24 comprises a piston 32 and a return spring 34, which urges the piston 32 into an unactuated initial position. The piston is in the unactuated initial position when the brake pedal 12 is not actuated. The unactuated initial position corresponds to a position of the brake pedal 12 in the rest position.

When the brake pedal 12 is actuated, the return spring 34 produces a resistance, which contributes to producing the feedback behaviour of the brake pedal 12. Moreover, the return spring 34 serves to move the brake pedal 12 back into its rest position.

In one exemplary arrangement, the return spring 34 is designed as a progressively acting spring arrangement. A spring arrangement of this kind comprises at least one spring element and has a non-linear characteristic. To be more precise, a progressive spring arrangement is relatively soft when the effective force is low, and becomes harder as the load increases.

The combined counterforce and damping unit 26 likewise has a piston 36, which delimits the pressure chamber 38 in the housing 30. When the brake pedal 12 is actuated, the pressure chamber 38 is compressed by the displacement of the piston 36.

Furthermore, the piston 36 delimits a vacuum chamber 40 in the housing 30, the volume of which is enlarged when the brake pedal 12 is actuated.

To seal off the pressure chamber 38 and the vacuum chamber 40 from one another, a ring seal 41, which rests against an inner wall of the housing 30, is arranged on the piston 36.

Both the pressure chamber 38 and the vacuum chamber 40 contribute to the damping effect of the combined counterforce and damping unit 26. This is because, with increasing compression of the pressure chamber 38, a pressure in the pressure chamber 38 increases, as a result of which a resistance rises during the actuation of the brake pedal 12. At the same time, a vacuum in the vacuum chamber 40 increases when the volume of the vacuum chamber 40 is enlarged as the piston 36 is actuated, as a result of which the resistance likewise rises during the actuation of the brake pedal 12.

The combined counterforce and damping unit 26 likewise has a return spring 42, which produces a resistance during actuation of the brake pedal 12. The return spring 42 of the combined counterforce and damping unit 26 is likewise designed as a progressively acting spring arrangement.

However, it is also conceivable for the unit 26 to be designed as a pure damping unit. In this case, the return spring 42 is omitted.

As a further alternative, the unit 26 can be designed as a pure counterforce unit. In this case, the pressure chamber 38 and the vacuum chamber 40 are not sealed off from one another, i.e. the ring seal 41 is omitted.

The first counterforce unit 24 and the counterforce and damping unit 26 are each coupled to the brake pedal 12 by means of an actuating plunger 44, 46.

The actuating plunger 44, 46 is in each case supported in an articulated manner on the brake pedal 12, e.g. by a rotary joint or a ball joint.

Due to the articulated connection between the actuating plunger 44, 46 and the brake pedal 12, a pivoting movement of the brake pedal 12 can be converted into a linear movement of the actuating plunger 44.

Moreover, the housings 28, 30 can likewise be pivoted during actuation of the brake pedal 12.

In an alternative exemplary arrangement, which is not illustrated for the sake of simplicity, the first counterforce unit 24 and the further counterforce and damping unit 26 can be supported by the brake pedal 12, on the one hand, and on the vehicle, on the other hand, via a common pivot bearing.

This means that, instead of supporting the two actuating plungers 44, 46 separately from one another in the brake pedal 12, the two actuating plungers 44, 46 of the first counterforce unit 24 and of the separate further counterforce and damping unit 26 can be connected by a transmission link, for example.

FIG. 2 shows schematically a brake pedal module 10 according to another exemplary arrangement.

In the case of the brake pedal module 10 illustrated in FIG. 2, the unit 26 is designed as a pure damping unit. However, it is likewise possible that the unit 26 is designed as a combined counterforce and damping unit, as illustrated in FIG. 1.

One significant difference from the arrangement illustrated in FIG. 1 is that the feedback unit 14 comprises a housing 48 in which the first counterforce unit 24, on the one hand, and the damping unit 26, on the other hand, are arranged parallel to one another. That is to say that the first counterforce unit 24 and the damping unit 26, which acts in parallel with the first counterforce unit 24 as regards their interconnection, are accommodated jointly in the housing 48.

The housing 48 can be secured pivotably on the vehicle. More specifically, the housing 48 is pivotably mounted on the support component 16.

In the exemplary arrangement, the first counterforce unit 24 is fixed mechanically in a pivotable manner on the brake pedal 12.

Alternatively, the damping unit 26 can be fixed mechanically in a pivotable manner on the brake pedal 12.

This means that only one of the two units 24, 26 is coupled to the brake pedal 12. For example, one of the two actuating plungers 44, 46 is coupled to the brake pedal 12.

In this case, the first counterforce unit 24 and the damping unit 26 are connected to one another by a transmission link 50.

In one exemplary arrangement, the transmission link 50 connects the two actuating plungers 44, 46 firmly to one another, ensuring that they can only be moved together.

Figure 3:
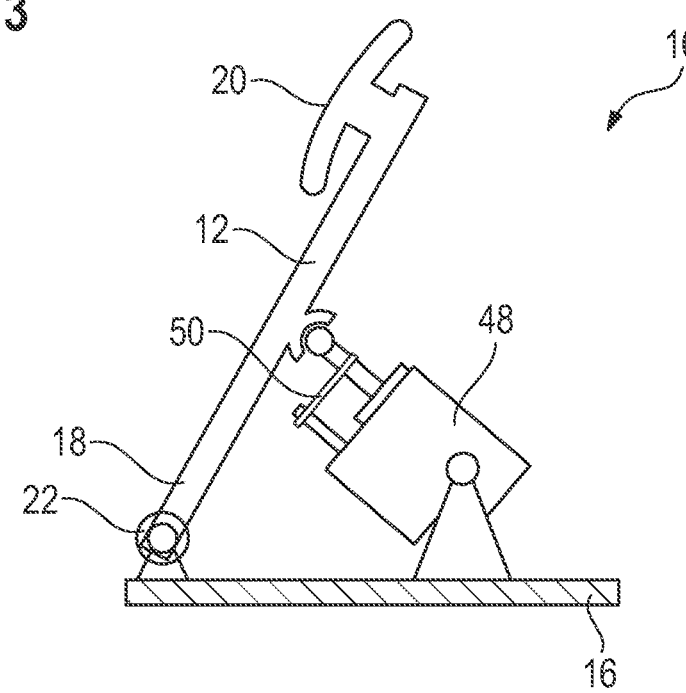
FIG. 3 shows schematically another brake pedal module according to the disclosure.

FIG. 3 illustrates another exemplary arrangement of the brake pedal module 10, which differs from the arrangement illustrated in FIG. 2 only in the precise arrangement of the pivot bearing by which the housing 48 is mounted on the support component 16.

Figure 4:
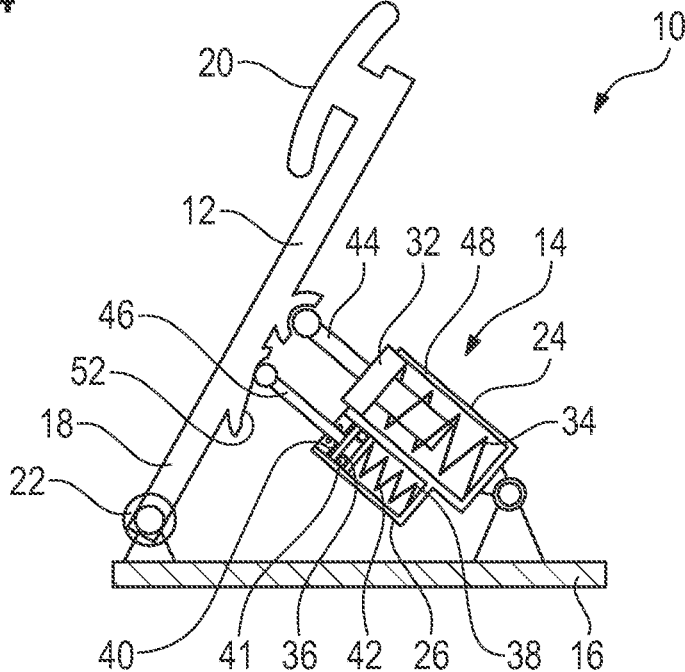
FIG. 4 shows schematically a brake pedal module according to the disclosure in accordance with another exemplary arrangement in a sectional illustration.

FIG. 4 illustrates an exemplary arrangement in which the first counterforce unit 24 and the further counterforce and damping unit 26 are accommodated in a common housing 48.

However, the first counterforce unit 24 and the further counterforce and damping unit 26 are not connected to one another by a transmission link.

Instead, that unit from the group comprising, on the one hand, the first counterforce unit 24 and, on the other hand, the further counterforce unit and/or damping unit 26 which is not fixed mechanically in a pivotable manner on the brake pedal 12 is supported in a sliding manner on the brake pedal 12. This means that the unit which is not coupled mechanically to the brake pedal 12, e.g. via a ball bearing or a pivot bearing, is supported in a sliding manner on the brake pedal 12.

To be more precise, the actuating plunger 44, 46 of the relevant unit 24, 26 is supported in a sliding manner on the brake pedal.

In the exemplary arrangement, the first counterforce unit 24 is fixed mechanically in a pivotable manner on the brake pedal, and the counterforce and damping unit 26 is supported in a sliding manner on the brake pedal. However, the situation can likewise be reversed.

In the exemplary arrangement, there is a guide surface 52 with a defined shape for sliding support. For example, the guide surface 52 is shaped in such a way that the actuating plunger 46 or piston 36 of the counter force and damping unit 26 is displaced linearly in the housing 30 when the brake pedal 12 is actuated by a defined travel, which depends on a pivoting angle of the brake pedal 12. For example, the guide surface is shaped in such a way that the two actuating plungers 44, 46 are displaced linearly by the same travel.

Figure 5:
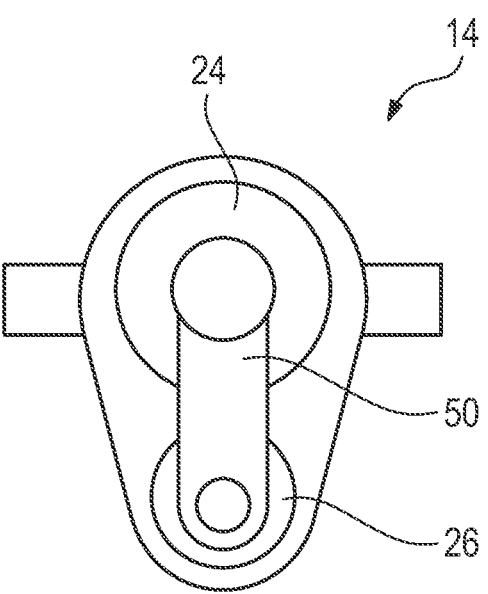
FIG. 5 shows schematically a section through a feedback unit of the brake pedal modules illustrated in FIGS. 2 to 4.

FIG. 5 shows the feedback unit from the FIGS. 2 and 3 in a plan view.

In the exemplary arrangements illustrated, the housing 48 is aligned in such a way that the first counterforce unit 24 and the further counterforce and/or damping unit 26 are arranged one above the other in an installed state in a vehicle.

Depending on the installation space situation, however, it is also possible that the first counterforce unit 24 and the further counterforce and/or damping unit 26 are arranged side-by-side or laterally offset with respect to one another. The same also applies with regard to the exemplary arrangement illustrated in FIG. 1, in which the first counterforce unit 24 and the further counterforce and/or damping unit 26 are formed separately from one another, and to the exemplary arrangement illustrated in FIG. 4, in which there is no transmission link 50.

The invention claimed is:

1. A brake pedal module for a brake-by-wire brake system of a vehicle, comprising a brake pedal, which can be secured pivotably on the vehicle and can be moved between a rest position and an end position, and a feedback unit for producing a resistance during actuation of the brake pedal, wherein the feedback unit has a first counterforce unit, which urges the brake pedal into the rest position, and at least one further counterforce unit, which acts in parallel with the first counterforce unit as regards their interconnection, and/or a damping unit, which acts in parallel with the first counterforce unit as regards their interconnection, wherein the first counterforce unit is directly connected to the brake pedal at a first position via a first actuating plunger and the at least one further counterforce unit and/or the damping unit is directly connected to the brake pedal at a second position via a second actuating plunger, wherein the second position of the brake pedal is different from the first position of the brake pedal.

2. A brake pedal module according to claim 1, wherein the brake pedal module has a support component for securing the brake pedal module on the vehicle, wherein the brake pedal is mounted pivotably on the support component.

3. The brake pedal module according to claim 2, wherein the first counterforce unit and the further counterforce unit and/or damping unit are modular units arranged separately from one another.

4. The brake pedal module according to claim 2, wherein the feedback unit is arranged between the brake pedal and the support component, and the feedback unit is attached to the support component.

5. The brake pedal module according to claim 4, wherein the feedback unit comprises a housing, in which the first counterforce unit, on one hand, and the further counterforce unit and/or damping unit, on another hand, are arranged parallel to one another.

6. The brake pedal module according to claim 1 wherein the first counterforce unit and the further counterforce unit and/or damping unit are modular units arranged separately from one another.

7. The brake pedal module according to claim 6, wherein the first counterforce unit, on the one hand, and the further counterforce unit and/or damping unit, on the other hand, are each coupled at one end to the brake pedal and, at the other end, are mounted on the vehicle.

8. The brake pedal module according to claim 1, wherein the feedback unit comprises a housing, in which the first counterforce unit, on one hand, and the further counterforce unit and/or damping unit, on another hand, are arranged parallel to one another.

9. The brake pedal module according to claim 8, wherein the housing is aligned in such a way that the first counterforce unit and the further counterforce unit and/or damping unit are arranged one above the other or side-by-side or laterally offset with respect to one another in an installed state in a vehicle.

10. The brake pedal module according to claim 8, wherein the housing can be secured pivotably on the vehicle.

11. The brake pedal module according to claim 10 wherein either the first counterforce unit, on one hand, or the further counterforce unit and/or damping unit, on another hand, are fixed mechanically in a pivotable manner on the brake pedal.

12. The brake pedal module according to claim 8, wherein the first counterforce unit and the further counterforce unit and/or damping unit are connected to one another by a transmission link.

13. The brake pedal module according to claim 8 wherein either the first counterforce unit, on one hand, or the further counterforce unit and/or damping unit, on another hand, are fixed mechanically in a pivotable manner on the brake pedal.

14. The brake pedal module according to claim 13, wherein the unit from the group comprising, on one hand, the first counterforce unit and, on another hand, the further counterforce unit and/or damping unit which is not fixed mechanically in a pivotable manner on the brake pedal is supported in a sliding manner on the brake pedal.

15. The brake pedal module according to claim 1, wherein the first counterforce unit and the further counterforce unit and/or damping unit are connected to one another by a transmission link.

16. The brake pedal module according to claim 15, wherein the housing is aligned in such a way that the first counterforce unit and the further counterforce unit and/or damping unit are arranged one above the other or side-by-side or laterally offset with respect to one another in an installed state in a vehicle.

\* \* \* \* \*